(12) United States Patent
Bludau et al.

(10) Patent No.: US 10,061,976 B2
(45) Date of Patent: Aug. 28, 2018

(54) DEVICE FOR CAPTURING PERSON-SPECIFIC DATA

(71) Applicant: Bundesdruckerei GMBH, Berlin (DE)

(72) Inventors: Alexander Bludau, Berlin (DE);
Gerhard Lueth, Berlin (DE);
Wolfgang Duemchen, Rheinsberg (DE)

(73) Assignee: Bundesdruckerei GmbH, Berlin (DE)

( * ) Notice: Subject to any disclaimer, the term of this patent is extended or adjusted under 35 U.S.C. 154(b) by 306 days.

(21) Appl. No.: 14/770,528

(22) PCT Filed: Feb. 14, 2014

(86) PCT No.: PCT/EP2014/052963
§ 371 (c)(1),
(2) Date: Aug. 26, 2015

(87) PCT Pub. No.: WO2014/131635
PCT Pub. Date: Sep. 4, 2014

(65) Prior Publication Data
US 2016/0012279 A1    Jan. 14, 2016

(30) Foreign Application Priority Data

Feb. 28, 2013   (DE) .................... 10 2013 203 433

(51) Int. Cl.
*G06K 9/00*    (2006.01)
*G06K 9/20*    (2006.01)
(Continued)

(52) U.S. Cl.
CPC ......... *G06K 9/00255* (2013.01); *G03B 15/03* (2013.01); *G06K 9/00006* (2013.01); *G06K 9/2036* (2013.01); *H04N 7/183* (2013.01)

(58) Field of Classification Search
CPC ............................ G06F 21/32; G06K 9/00255
See application file for complete search history.

(56) References Cited

U.S. PATENT DOCUMENTS 9,235,782 B1 * 1/2016 Zomet ................ G06K 9/00281
2006/0210124 A1 * 9/2006 Ishii .................... G06K 9/00255
382/118
(Continued)

FOREIGN PATENT DOCUMENTS

JP    2007 025758    2/2007
WO   WO 2004/044836   5/2004
(Continued)

OTHER PUBLICATIONS

EPO IPR, PCT/EP2014/051297, May 13, 2014.
(Continued)

*Primary Examiner* — Tung Vo
*Assistant Examiner* — Rowina Cattungal
(74) *Attorney, Agent, or Firm* — Harness, Dickey & Pierce, P.L.C.

(57) ABSTRACT

The disclosure relates to a device for capturing person-specific data of a person, wherein the person-specific data comprises a facial image of the person, wherein the device has a camera for recording the facial image of the person, a lighting apparatus, and a semi-transparent mirror, wherein the semi-transparent mirror is arranged between the person and the camera, wherein the semi-transparent mirror is oriented such that, on the side of the semi-transparent mirror facing towards the person, the optical path of light incident on the semi-transparent mirror is parallel to the optical path of the portion of this light reflected back by the semi-transparent mirror, wherein the lighting apparatus is used to illuminate the person from the front, wherein the device also has a control unit for capturing an image, by generating light by means of the lighting apparatus in order to illuminate the face of the person and, during the illumination, capturing a first image of the face of the person by means of the camera, capturing a second image of the face of the person by means (Continued)

of the camera without generation of the light, forming a first differential image of the first image and the second image, wherein in the first differential image the face of the person is freed from the background, wherein the person-specific data comprises the first differential image as the facial image.

19 Claims, 4 Drawing Sheets

(51) Int. Cl.
*H04N 7/18* (2006.01)
*G03B 15/03* (2006.01)

(56) References Cited

U.S. PATENT DOCUMENTS

| | | | |
|---|---|---|---|
| 2007/0280669 A1* | 12/2007 | Karim | G03B 11/00 396/155 |
| 2008/0292151 A1* | 11/2008 | Kurtz | A61B 3/10 382/128 |
| 2012/0249826 A1* | 10/2012 | Kobayashi | G06K 9/036 348/222.1 |
| 2012/0293642 A1* | 11/2012 | Berini | G06F 21/32 348/77 |

FOREIGN PATENT DOCUMENTS

| | | |
|---|---|---|
| WO | WO 2005/050508 | 6/2005 |
| WO | WO 2013/010786 | 1/2013 |

OTHER PUBLICATIONS

Liu et al., "Automatic Segmentation of Focused Objects from Images with Low Depth of Field", Pattern Recognition Letters, Bd. 31, Nr. 7, May 1, 2010, pp. 572-581, ISSN: 0167-8655.

Norimatsu et al., "Detection of the Gaze Direction Using the Time-Varying Image Processing", Proceedings Intelligent Transportation Systems, IEEE, Oct. 12, 2003, pp. 74-79, ISBN: 978-0-7803-8125-4.

\* cited by examiner

DEVICE FOR CAPTURING PERSON-SPECIFIC DATA

The invention relates to a device for capturing person-specific data, a method for capturing person-specific data, and a computer program product.

Identification documents, such as identity cards, have to be personalised. The data required for personalisation, such as name and address of the person associated with the identification document, have to be captured by hand by a corresponding government official. In addition, the person applying for the identification document can usually create the passport images necessary for the identification document in a photograph and transfers these images to the authority or document centre issuing the identification document. Here, the issuing of an identification document is very complex and costly, both for the receiver of the document and also the issuer of the document.

By way of example EP 1 563 452 B1 discloses a production method for an ID card or the like and an arrangement for the production of a card of this type.

The object of the invention is to create a device for capturing person-specific data of a person, a method for capturing person-specific data of a person, and also a computer program product.

The objects forming the basis of the invention are achieved by the features of the independent claims. Preferred embodiments of the invention are specified in the dependent claims.

A freestanding device for capturing person-specific data of a person is preferably specified, wherein the person-specific data comprises a facial image of the person, wherein the device has a camera for recording a facial image of the person, a lighting apparatus, and a semi-transparent mirror. The semi-transparent mirror is arranged between the person and the camera, wherein the semi-transparent mirror is oriented such that, on the side of the semi-transparent mirror facing towards the person, the optical path of light incident on the semi-transparent mirror is parallel to the optical path of the portion of this light reflected back by the semi-transparent mirror. In addition, the lighting apparatus is used to illuminate the person from the front, i.e. to illuminate the part of the person facing towards the camera. The device also has a control unit for performing image capture, comprising the following steps:

generating light by means of the lighting apparatus in order to illuminate the face of the person and, during the illumination, capturing a first image of the face of the person by means of the camera, capturing a second image of the face of the person by means of the camera without generation of the light, forming a first differential image of the first image and the second image, wherein in the first differential image the face of the person is freed from the background, wherein the person-specific data comprises the first differential image as the facial image.

Embodiments of the invention could have the advantage that, by means of the device and independently of the installation site thereof, the image background used and without the need of a professional photographer, facial images of a person can be captured that are free from a background in front of which the image has been taken. A facial image depicting a face of a person freed from a background could have the advantage that, in particular when creating identification documents, security features located on the identification document can be introduced until directly at the contours of the face of the person. If, specifically, the identification document were to carry a facial image inclusive of background, appropriate security features could not be introduced so closely to the actual face of the person. In this case, the term "image" means the entire image inclusive, where applicable, also of a single-colour or neutral background, wherein this background may be larger or smaller depending on the face shape.

If security features are then also to be introduced in an automated manner into the identification document, a security feature can be introduced as far as the facial contours only with great difficulty, since there is always the risk that the security feature then covers parts of the face and thus makes the face unrecognisable. By contrast, in accordance with the above-described image capture, a face of the person freed from the background and which can be further processed in an automated manner is provided in a fully automated manner. When producing the identification document, the point at which the facial contours start and the point at the facial contours up to which the security features can be introduced are thus known beforehand.

In the case of image capture the background will have an identical or practically identical illumination both when capturing the first image and when capturing the second image. The illumination of the face used for capturing the first image is specifically to be designed only such that the face is illuminated optimally. Any background present therefore is not influenced. There is thus the fundamental difference between the first and the second image that on the one hand the face of the person is illuminated lightly and therefore is easily recognisable, and on the other hand the face of the person appears darker since it is not illuminated. However, in both cases the brightness of the background is identical or practically identical. These differences make it possible, when forming the first differential image, to remove the background and therefore free the entire face of the person from the background The use of a semi-transparent mirror between the person and the camera in the above-described manner could have the advantage that an orientation, which is optimised for biometric images, of the face of the person to be captured and of the camera is provided automatically. The person will automatically look into the camera in a "biometrically correct manner", since the person sees themselves as a mirror image in the semi-transparent mirror. In addition, the person will automatically adapt the inclination of the head to the left or right and/or upwardly or downwardly, such that a natural viewing direction in the direction of the camera is provided.

In accordance with one embodiment of the invention the light generated is white light, wherein the control unit is also designed to:

control the lighting apparatus for generation of coloured or infrared light by the lighting apparatus for illuminating the face of the person and to control the camera in order to capture a third image of the face of the person by the camera during the illumination, capture a fourth image of the face of the person by means of the camera without the generation of light, form a second differential image of the third image and the fourth image, wherein in the second differential image the face of the person is freed from the background, and to calculate the outer contours of the face from the second differential image, correct the first differential image with the outer contours calculated from the second differential image.

It should be noted at this juncture that the fourth image may be identical to the second image, i.e. that in this case a second image of the face of the person is captured by the camera merely once without the generation of light, and this second image is then used as the fourth image when forming the second differential image.

The use of coloured light in order to calculate the outer contours of the face could have the advantage that, on account of the use of a colour, such as yellow, blue or red, a very intense difference of the face illuminated in this colour from the surrounding environment, i.e. from the background, is created. Whereas, for example against a grey background with white illumination, grey hair will give a rather poor contrast, it is possible in these situations as well, by the use of a colour such as yellow, to provide individual face parts inclusive of hair with a colouring that contrasts clearly from the background. This colouring can then be captured by the camera and used to determine exactly the outer contours of the face, i.e. the main parts inclusive of the hair.

It should be noted at this juncture that the calculation of the outer contours can be performed a number of times for differently coloured light by means of which the face of the person has been illuminated. It is also quite possible to illuminate the face of the person successively in different colours and then to perform the calculation of the outer contours with use of one of the coloured images thus captured or all captured coloured images. The third image of the face of the person is preferably captured in a filtered manner in accordance with the use of the coloured or infrared light.

The generation of infrared light and a subsequent preferable capture of the third image of the face of the person in the infrared range could have the advantage that the contrasts of the face are visible in intensified form as a result. This assists the calculation of the outer contours of the face in an optimising manner.

In accordance with one embodiment of the invention brightness differences of the pixels used to form the differential image are used to form the differential image, wherein all pixels of which the brightness difference lies below a predetermined threshold value are associated with the background. In the case of the first differential image, the brightness differences are thus brightness differences of the pixels at the same positions of the first and second image, whereas in the case of the second differential image the brightness differences are brightness differences of the used pixels at the same positions of the third and fourth image. As already mentioned above, it can be assumed that in the illuminated and un-illuminated state of the face the background has practically the same brightness, such that no brightness differences of the background will be visible between the first and second image. All areas of which the brightness differences lie below a predetermined maximum threshold value can then be removed as background of the first differential image.

In accordance with one embodiment of the invention the camera has a lens, wherein the lens is configured to capture exclusively the face of the person in focus and to capture the background out of focus, wherein the control unit is also configured to calculate the outer contours of the face from the sharpness difference of the face of the person and the background and to correct the first differential image with the calculated outer contours.

By way of example, it may be that the depth of field of the lens is selected such that exclusively the face of the person shows details, whereas all other objects distanced from the focus point by more than a third of the distance between the camera and the focus point of the camera are to be designated as clearly out of focus. The number of line pairs that can be resolved at a distance of said third of the distance between camera and focus point should therefore be at most 20%, preferably 10% of the number of line pairs per millimetre that can be resolved in the focus point by the camera.

Due to the calculation of the outer contours of the face from the difference in sharpness of the face of the person and of the background, an alternative or additional possibility is created for correcting the first differential image with the calculated outer contours in the most accurate manner possible.

In accordance with a further embodiment of the invention the lighting apparatus is configured to illuminate the person with polarised light, wherein the camera has a polarisation filter, wherein the polarisation direction of the polarised light and the polarisation direction of the light transmitted through the polarisation filter into the camera are rotated by 90° relative to one another.

This could have the advantage that undesirable reflections, for example in spectacles of the illuminated person, are heavily minimised. It is thus possible in an automated manner to capture high-quality facial images of a person that additionally also meet the standards of biometric images.

In accordance with one embodiment of the invention the control unit is also configured for the analysis of the facial image of the person, wherein the analysis comprises a determination of the head posture and/or the eye posture, wherein the control unit is also configured, in the event that the head posture and/or eye posture does/do not meet predefined criteria, to automatically reject the facial image of the person.

The camera is preferably configured to capture a plurality of images successively in a video stream, wherein the control unit is also configured, when forming the first differential image and/or the second differential image, to use only the images of the video stream that meet predefined quality criteria. For example, the quality criteria may include a predefined spatial position of the eye area of the person and/or a maximally admissible movement blur of the person and/or a predefined size of the face of the person in the images.

The use of a video stream could have the advantage that a multiplicity of images can be captured in the shortest time. The likelihood that at least one of the images captured in the short period of time has a high quality in order to be used ultimately to form the first differential image is thus significantly increased. In addition, the person captured by the camera is spared having to look continuously into the camera over a long period of time, which may usually lead to distorted and unnatural facial expressions.

In addition, the use of a video stream may have the advantage that in the event of a movement of the person the moment at which the face of the person is oriented optimally relative to the camera can be awaited. If the movement of the person here is sufficiently slow, the movement blur will be negligible or may not even be present.

Since the person can also move towards the camera or away from the camera, the predefined size of the face of the person may also be relevant, since here as well it is possible to wait in order to achieve an optimal distance between the face of the person and camera, such that the lighting apparatus used can illuminate the face of the person uniformly.

In accordance with one embodiment of the invention the camera is height-adjustable by means of a drive unit, wherein the control unit is also configured, to capture the spatial position of the eye area of the person relative to the position of the camera, and, in the event that the spatial position of the eye area is not located in a predefined region relative to the position of the camera, to actuate the drive unit in order to automatically move the height of the camera via the drive unit, such that the spatial position of the eye area is located in the predefined region relative to the position of the camera.

It could thus be ensured that the face of the person is always oriented optimally relative to the camera. The person will thus never look into the camera from above or look into the camera from below, but the camera will always be arranged automatically at a height with respect to the eye area of the person that is correct in particular for the capture of biometric images. This also could predestine the use of the device in autonomous form and in particular without corresponding operating personnel. The device will be able to record images in an optimised manner automatically.

In accordance with one embodiment of the invention the detection of the spatial position of the eye area and the movement of the camera via the drive unit are performed continuously. Movements of a person as considered in the vertical direction can thus also be compensated for via the drive unit.

In accordance with one embodiment of the invention the camera is also configured to capture infrared light, wherein the control unit is also configured to capture a fifth image of the face of the person by the camera without illumination of the face of the person by means of the lighting apparatus, wherein the fifth image is captured in the infrared wavelength range. The control unit is also configured to calculate the outer contours of the face from the fifth image and to perform the correction of the first differential image with the outer contours calculated from the fifth image.

The use of the infrared wavelength range when capturing the fifth image of the face of the person could have the advantage that here differences between the warm body parts of the person, which irradiate infrared light, and the relatively cool areas of the surrounding background can be captured in a particularly clear manner. This makes it possible to calculate the outer contours of the face in a particularly precise manner and therefore allows the accordingly precise correction of the first differential image with the outer contours calculated from the fifth image.

In accordance with one embodiment of the invention the device has a reader for an identification document of the person, wherein the reader is configured, in the activated state, to read out personalised information of the person from the identification document, wherein the person-specific data comprises the personalised information.

By way of example, said identification document could be an identification document having what is known as an eID function. The eID function of an identification document makes it possible to release the personalised information requested by the device via the reader from the identification document using a personal secret PIN and to transmit this information. Since a corresponding identification document with eID function, in particular an identity card, has been issued by a central federal agency and in addition the device or the reader has likewise been provided by this central federal agency with an electronic authorisation certificate, it is possible that the device can be certain that the person using the identification document is also in fact the person who he/she claims to be. In addition, the person using the identification document can be certain that only data considered necessary for this purpose specifically for the device from the central federal agency is read out from the identification document.

In accordance with one embodiment of the invention the device also comprises a fingerprint sensor, wherein the fingerprint sensor is configured, in the activated state, to capture a fingerprint of the person, wherein the person-specific data comprises the captured fingerprint.

In accordance with one embodiment of the invention the device also comprises a control panel, wherein the control panel is configured, in the activated state, to capture an alphanumeric data input of the person and/or an input of a signature of the person, wherein the person-specific data comprises the captured data input and/or signature. By way of example, the captured data input is the name, address and date of birth of the person.

Due to the provision of the further content with regard to the person-specific data, it is possible to carry out a complete capture of all relevant person-specific data necessary for creating an identification document, using the same terminal. The control unit, however, is preferably configured such that the reader and/or the fingerprint sensor and/or the control panel are to be set exclusively to the activated state, at most until a facial image of the person is captured by the camera. It is thus possible to prevent different people from being involved in the data input, such that, in some circumstances, the facial image of the person does not match the captured fingerprint or the captured further inputs of the person inclusive of the signature of the person. It is thus preferably continuously checked whether the person is standing in front of the device or whether the person operating the device changes in anyway in the meantime.

In accordance with one embodiment of the invention the device also comprises a network interface, wherein the device is configured to transfer the person-specific data to an apparatus for the automated generation of the identification document from the person-specific data or to an apparatus for verifying the person-specific data. The apparatus for the automated generation of the identification document could be a device for printing the identification document, for example. In this case an employee of an authority or a company that issues the identification document could check on a random basis merely in a subsequent step whether the information contained on the identification document, such as fingerprint, facial image, name etc.

is also to be associated with the person for whom the identification document has been produced.

In the event that the person-specific data could be transferred to an apparatus for verifying the person-specific data, this could be a computer belonging to an authority, for example. Here, the person requesting the identification document goes to the authority, for example. At the authority it is checked on a random basis prior to generation of a corresponding identification document whether the information contained in the person-specific data is correct for said person.

In accordance with one embodiment of the invention the device is a freestanding machine, wherein the machine is preferably free from a back wall arranged behind the face of the person to be captured as viewed from the camera. By way of example, this is a floor-mounted apparatus having a base and an operating terminal, wherein the apparatus can be placed freely in a space. The user approaches the device without having to enter a corresponding cabin or the like. Nevertheless, it is possible, using the device, to capture high-quality images of a face of the person that above all else also satisfy biometric standards.

In accordance with one embodiment of the invention the lighting apparatus is arranged around the semi-transparent mirror. This could ensure a particularly homogeneous illumination of the face of the person.

In a further aspect the invention relates to a method for capturing person-specific data of a person by means of a device, wherein the person-specific data comprises a facial image of the person, wherein the device has a camera for recording the facial image of the person, a lighting apparatus and a semi-transparent mirror, wherein the semi-transparent mirror is arranged between the person and the camera, wherein the semi-transparent mirror is oriented such that, on the side of the semi-transparent mirror facing towards the person, the optical beam of light incident on the semi-transparent mirror is parallel to the optical beam of the portion of this light reflected back by the semi-transparent mirror, wherein the lighting apparatus is configured to illuminate the person from the front, wherein the method comprises the steps of:

generating light by means of the lighting apparatus in order to illuminate the face of the person and, during the illumination, capturing a first image of the face of the person by means of the camera, capturing a second image of the face of the person by means of the camera without generation of the light, forming a first differential image of the first image and the second image, wherein in the first differential image the face of the person is free from the background, wherein the person-specific data comprises the first differential image as the facial image.

In a further aspect the invention relates to a computer program product with instructions that can be executed by a processor for carrying out the method steps as described above.

In a further aspect the invention relates to a signal sequence which, when stored in a computer, constitutes a sequence of instructions, which, when executed on this computer, executes the previously described method.

It should be noted that the above-described embodiments of the invention can be combined with one another arbitrarily, provided the combined embodiments are not mutually exclusive.

Preferred embodiments of the invention will be explained in greater detail hereinafter with reference to the drawings, in which.

Similar elements will be designated hereinafter by like reference signs.

Figure 1:
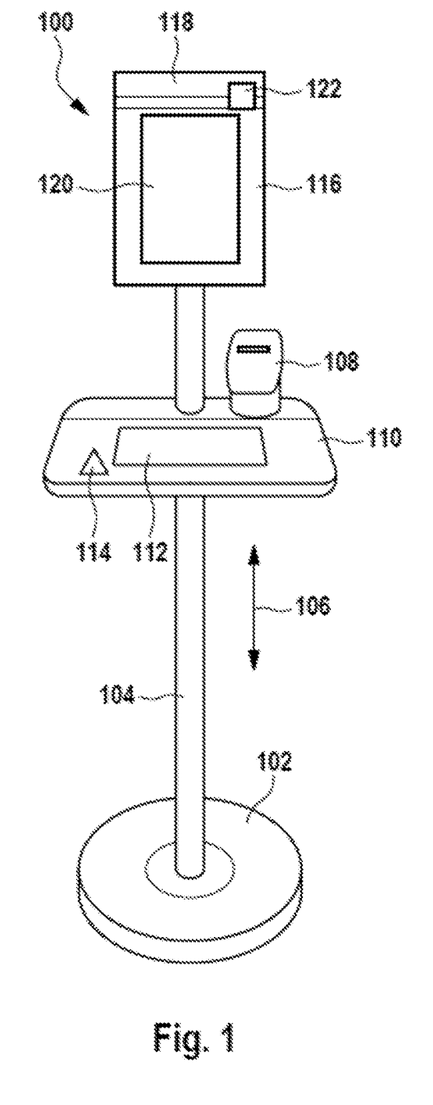
FIG. 1 shows a frontal view of a device for capturing person-specific data of a person.

The figure shows a schematic view of a freestanding device 100 for capturing person-specific data of a person. The person-specific data here may comprise a facial image of the person, wherein the device has a camera for recording the facial image of the person. The camera in FIG. 1 is located such that it cannot be seen, behind a semi-transparent mirror 120, which is arranged at head height of said person. A lighting apparatus 118, which serves to illuminate the face of the person, is arranged around the semi-transparent mirror. The region of the semi-transparent mirror 118 behind which the camera is arranged and the lighting apparatus 118 will be referred to hereinafter as the head part 116 of the device 100.

Besides the head part 116, the device 100 also has a control panel 110 having a touch-sensitive screen 112. A fingerprint sensor 114 is arranged on the control panel 110, via which fingerprint sensor the user can transmit his/her fingerprints to the device 100.

A reader 108 is also arranged on the control panel 110 and is configured to read out personalised information of the person from an identification document of the person. By way of example, the reader 108 can communicate with the identification document via a near-field communication interface. A user of the identification document is additionally able to input a PIN for use of the eID function of the identification document into the device 100 via a PIN pad of the reader 108.

The head part 116 can be moved in the vertical direction 106 via a lifting column 100 together with the control panel 110 and the operating elements arranged there. The lifting column 104 is itself arranged in turn on a stand 102.

Figure 2:
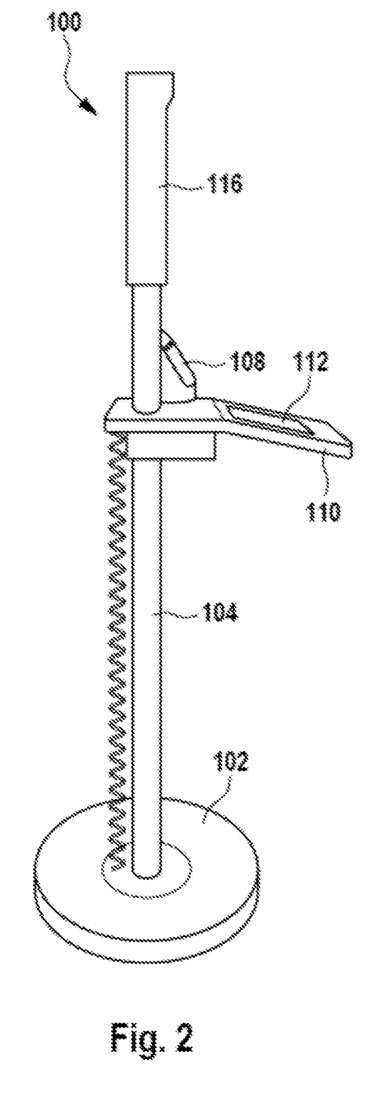
FIG. 2 shows a side view of the device of FIG. 1.

In FIG. 2 the device 100 is shown again in a side view, wherein here it can be seen that the control panel 110 is inclined slightly towards the user, for example by 20°, in order to facilitate for the user the corresponding inputs and reading of information possibly displayed on the touch-sensitive screen 112. The touch-sensitive screen 112 is installed here such that the surface thereof terminates flush with the surface of the control panel and thus creates a continuous surface.

In FIG. 1 it can also be seen that a loudspeaker 122 is arranged on the head part 116. Both the loudspeaker 122 and the touch-sensitive screen 112 can be used to communicate to the user of the device 100 instructions necessary for use. This information may include, for example, a greeting of the user and also a menu guide of the user up to the request to place an index finger on the fingerprint sensor 114 and/or the supplying of an identification document to the reader 108. In addition, when a facial image is to be captured, the user may also be requested by the camera arranged behind the semi-transparent mirror 120 to direct his/her head in a manner that is favourable in particular for the capture of biometric images. This all occurs in a fully automated manner, such that here are there is no need for further operating personnel or support personnel during use of the device 100.

The head part 116 is surrounded by a box-shaped plastic housing, of which the side facing towards the user contains the semi-transparent mirror 120. Here, the semi-transparent mirror 120 is large enough that a user standing in a position in front of the control panel 110 and captured naturally when reading from the touch-sensitive screen 112 for example sees the portrait image to be recorded when looking into this mirror 120.

Figure 3:
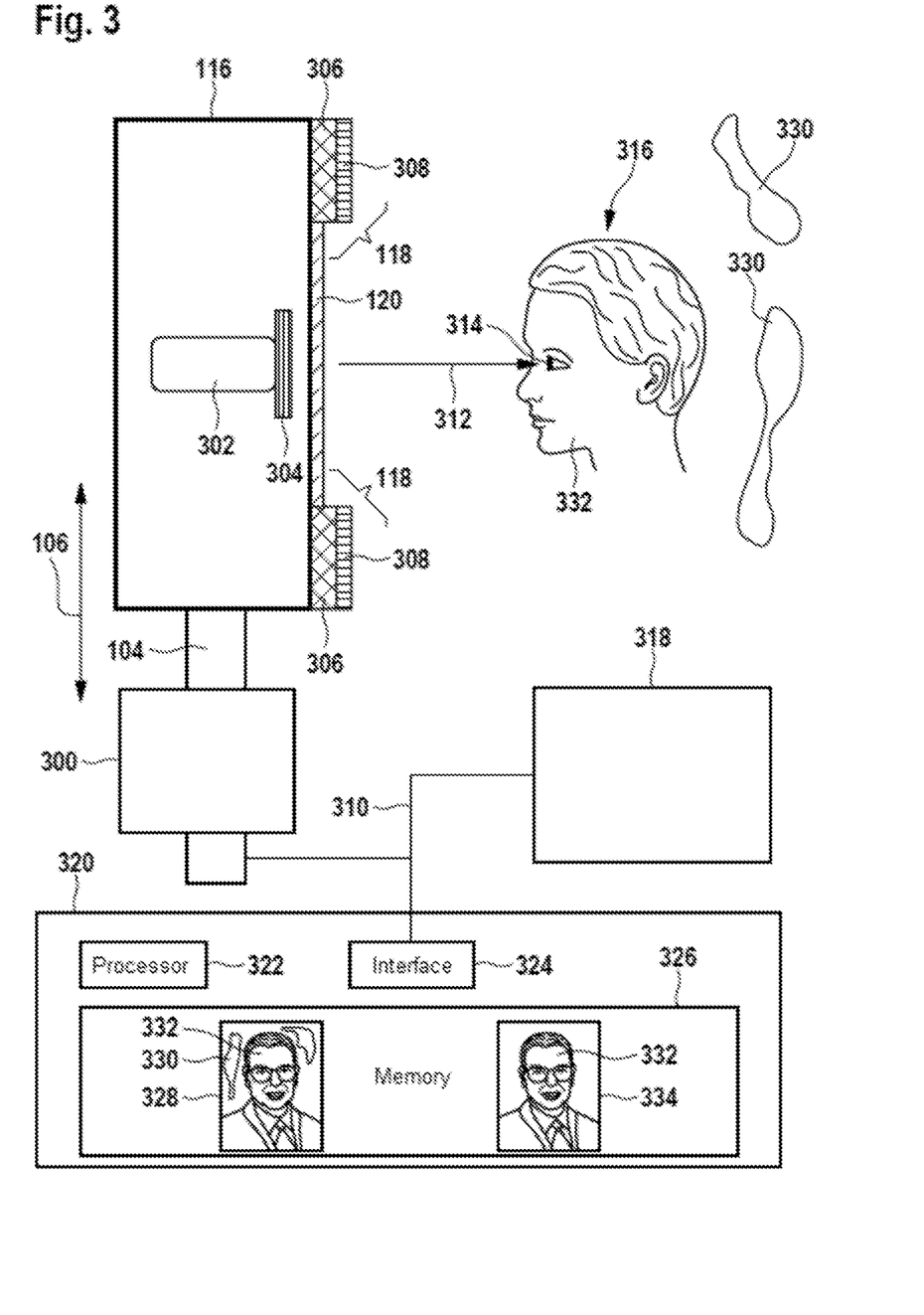
FIG. 3 shows a further view of a device for capturing person-specific data of a person.

In FIG. 3 a cross-sectional view of the head part 116 is shown in detail. Now, the camera 302, which is arranged in the head part 116, can be seen. The semi-transparent mirror 120 is arranged between the person 316 and the camera 302, wherein the semi-transparent mirror 120 is oriented such that the optical axis of the camera is perpendicular to the surface of the mirror 120. In other words, the semi-transparent mirror 120 is oriented such that, on the side of the mirror facing towards the person 316, the optical path of light incident on the semi-transparent mirror is parallel to the optical path of the portion of this light reflected back by the semi-transparent mirror.

The head part 116 can be adjusted in the vertical direction via the lifting column 104 and a drive 300 associated with the lifting column 104. The height adjustment in the direction 106 is used to automatically adapt the vertical position of the camera 302 relative to the height of the eyes 314 of the person 316. Whereas the device 100 in the basic state, i.e. before a corresponding user approaches the device, preferably is approximately the size of an adult person, the device 100 can be adjusted via the drive 300 independently to the current eye height of the person once the person has approached. The horizontal line designated by reference sign 112 here corresponds to the optical axis of the camera 302, which coincides with the eye height of the eyes 314.

The mirror 120 encourages the person 316 to look thereinto, such that the person automatically adopts a head posture that appears to be favourable for the person.

In order to now control the device 100, the device 100 is connected via a data line 310 to a control unit 320. Here, this control unit may be part of the device 100. The control unit 320 has a processor 322 and a memory 326. The memory 326 may contain instructions for controlling the individual components of the device 100. The control unit 320 is connected to the data line 310 via an interface 324.

Figure 4:
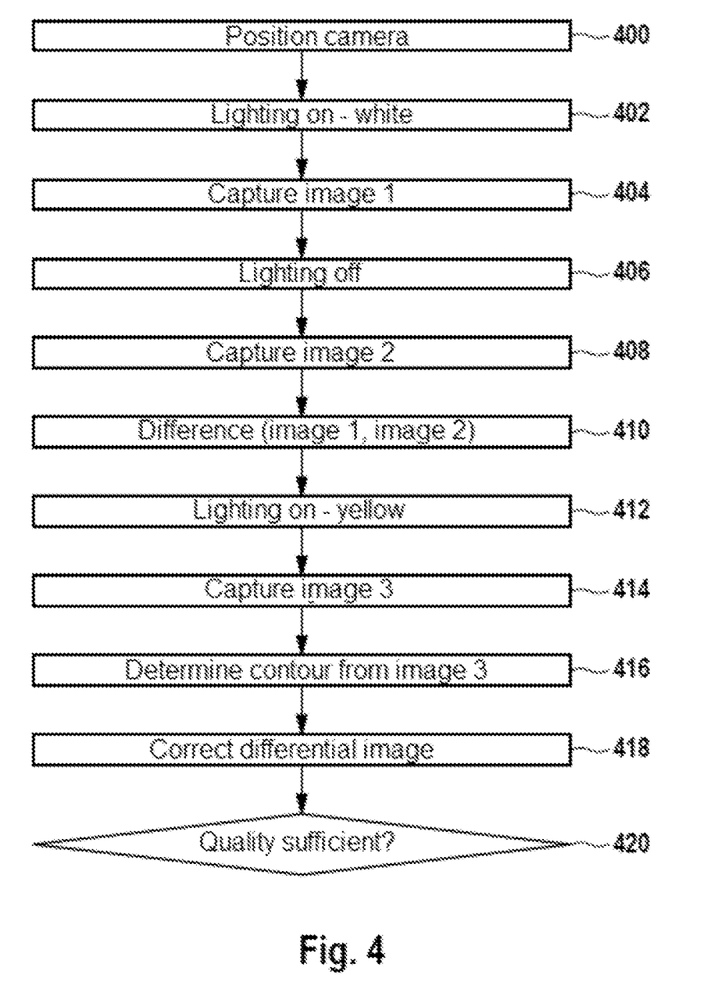
FIG. 4 shows a flow diagram of a method for capturing the facial image of a person.
Figure 5:
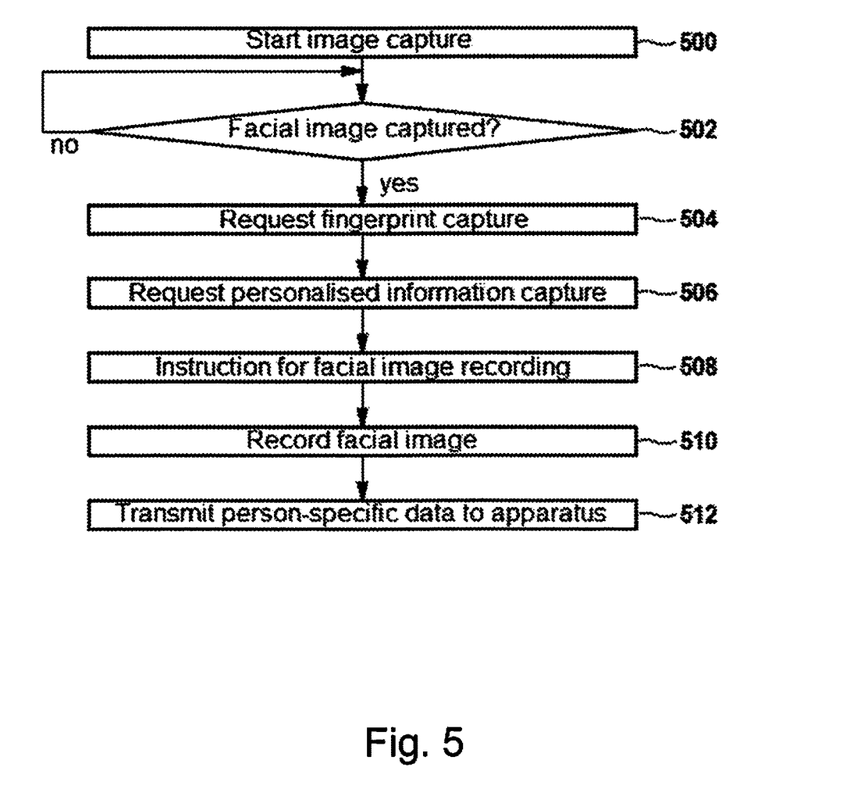
FIG. 5 shows a flow diagram of a method for image capture.

The way in which person-specific data of the person 316 can be captured by means of the device 100 is described hereinafter by way of example with reference to FIG. 3 and with the aid of the flow diagrams of FIGS. 4 and 5:

The method starts with step 500 and an image capture by means of the camera 302. As soon as the camera captures an image of the face of the person 316 (step 502), communication of the device 100 with the person 316 is initiated via a corresponding programme contained in the memory 326 of the control unit 320. When the camera 302 captures a facial image of the person 316, the device can be certain that a person is now located in front of the head part 116 of the device 100. The person can now be greeted by the device 100 via the loudspeaker 122 (see FIG. 1). Furthermore, it is now possible to explain in an automated manner via the loudspeaker how the person-specific data of the person 316 will be captured subsequently.

Alternatively or additionally to the communication of the device 100 with the person 316 via the loudspeaker, communication may also take place with the person 316 via the touch-sensitive display 112. By way of example, corresponding operating instructions could be superimposed on the touch-sensitive display 112.

If in step 502 no facial images captured, the system 100 passes into a sleep mode, in which it is continuously checked whether a person 316 is presently located in front of the camera 302.

Under the assumption that the person 316 has now been detected in front of the camera 302 and an optional appropriate greeting and instruction of the person 316 has taken place in an automated manner by the device 100, a request can be output by the device in step 504 for the person to place a finger on the fingerprint sensor 114. A fingerprint of the person 316 can then also be captured in an automated manner via the sensor 114 in step 504.

In the meantime, the camera 302 preferably checks permanently whether the user is still located in front of the camera 302. Should the user have moved away from the camera in the meantime, it is possible that another person has passed in front of the device 100 and instead has placed their finger on the fingerprint sensor 114. For this reason, the control unit 320 is configured such that, as soon as the person 316 has moved away from the camera 302 in a certain way, the fingerprint capture is aborted. A corresponding misuse is therefore prevented.

Once the fingerprints has been captured in step 504, an output is made in step 506, by means of which the person 316 is requested to provide personalised information. There are a number of possibilities for this. On the one hand, the user can manually input their personalised information via the touch-sensitive display 112. The user may input their name, date of birth and address, for example. The input is made here by typing on the touch-sensitive display 112 or with use of an appropriate stylus, by means of which it is possible write on the display 112.

Alternatively or additionally it is possible, via the reader 108, to read out parts of the personalised information or even all personalised information from a provided identification document of the person. If this identification document has what is known as an eID function, the user is thus requested to input a corresponding PIN, in particular into the reader, in order to release the readout of the personalised information. Following successful PIN check, the personalised information can be read directly into the memory 326 from the identification document.

It should be noted at this juncture that this method lends itself particularly when an owner of an identity card with eID function wishes to replace this "old" identity card with another new identity card. By way of example, this may be necessary because the address of the person has changed because the person has moved. In this case it is sufficient when all relevant personalised information is read out from the old identification document via the reader 108 and a facial image is additionally taken via the camera 302 in order to create the new identification document. In addition, the fingerprint data can be captured as described above, optionally or additionally. This collected information ("person-specific data") is then transferred to a computer of a government official, who can again check on a random basis whether the person-specific data provided to him by the device 100 also actually belongs to the person currently sitting opposite him and who has requested the new identity card.

However, it is also possible that the reader 108 additionally has a camera and can compare the facial image printed on the old identity card with the facial image currently delivered by the camera 302. If the two facial images are identical, the device 100 can be certain that the person 316 in front of the camera 302 is also authorised to request the new identification document.

Once personalised information has been input in step 506, instructions are output in step 508 for the subsequent recording of a facial image. By way of example, the instructions could invite the person 316 to look themself in the eyes via the mirror 120 without smiling in order to thus meet the requirements of a biometric passport image. The facial image is then recorded in step 510 via the camera 302. Once all steps have been performed, the person-specific data captured in steps 504 to 510 can be transmitted in step 512 to a corresponding apparatus 318 for processing data via the data line 310 and the interface 324.

Step 510 of recording the facial image will be explained hereinafter in detail, in particular in conjunction with the flow diagram of FIG. 4. In order to record the facial image, the camera is firstly positioned in an optimised manner in step 400, preferably in the vertical direction 106, relative to the eye height of the eyes 314 of the person 316. Here, the lens of the camera 302 is selected and adjusted such that the capturable camera image is much larger than the camera image of the facial image of the person 316 to be created. In other words the camera 302 sees much more than only the face of the person 316. If the camera 302 is located below the height of the eyes 314 because the person is very tall, the control unit 320 will determine this following an analysis of the current image recorded by the camera 302 and will output to the drive 300, via the interface 324 and the data line 310, the command to move the head part 116 further upward. This optimised positioning of the camera with step 400 is performed at least until the camera 302 is located in the direction 312 at the height of the eyes 314 of the person 316.

The person 316 may be located in front of any background having any background elements 330 for the subsequent recording of the facial image. In particular, it is not necessary to use a neutral background for this purpose, which for example is set up in the form of a wall behind the person 316. This is made possible by the following steps of recording the facial image:

In step 402 a lighting is firstly switched on via the lighting apparatus 118 of white colour. This lighting is used to illuminate the face of the person 316 from the front, i.e. in the direction 312. For this purpose the lighting apparatus 118 has a corresponding illuminant 306, for example LEDs.

In step 404 the face of the person thus illuminated is recorded and is stored in the memory 326 as a first image 328 of the face of the person 316. Here, the first image 328 initially shows both the face 332 of the person 316 and the background 330 in front of which the person 316 is placed.

In step 406 the lighting is switched off and a second image is captured by the camera 302 in step 408. Due to the switched-of lighting, the face 332 of the person 316 will appear much darker in the second image, whereas the background 330 will remain practically unchanged. The reason for this lies in the fact that the previously performed illumination of the face 332 by the lighting apparatus 306 was designed merely such that the face was illuminated, but by contrast not additionally the background 330.

In step 410 a differential image 334 of the first image 328, i.e. the image lit with white light, and of the second image, i.e. the unlit image, is formed. When forming the differential image 334, brightness differences of the pixels of the images are used, wherein all pixels of which the brightness difference lies below a predetermined threshold value are now associated with the background. Image features that have virtually no brightness difference are thus removed by the differential formation. This concerns the background 330, such that the background 330 is removed from the differential image produced in step 410. The face 332 of the person is thus freed from the background in the differential image 334.

In order to further optimise this process of background elimination, the lighting can be switched on again in step 412, wherein here a coloured lighting is selected. By way of example, the face 332 may now be illuminated with a yellow colour. Here, the yellow colour contrasts strongly from a natural colouring of the background, such that, following a corresponding image capture in step 414 from the image thus captured in step 416, the contours of the face inclusive of the hair can be calculated. The differential image determined in step 410 can then be optimised and corrected with the outer contour of the face thus calculated.

The optimisation and correction can be performed here in a variety of ways. By way of example, a new differential image could be formed with use of the first and second image still located in the memory 326, wherein here a corresponding weighting of the brightness differences can be performed with use of the contours. Alternatively or additionally, it is possible to subsequently remove parts from the differential image that have to be assigned to the background on account of the contours or to subsequently add to the differential image elements of the first image that have to be assigned to the actual face of the person.

Following the correction of the differential image in step 418, a check is performed in step 420 in order to check whether the quality of the facial image 330 thus determined corresponds to predefined criteria. These criteria by way of example may include the meeting of predefined biometric requirements when capturing facial images.

If the quality is sufficient, the facial image of the person 316 thus created can be depicted via the touch-sensitive display 112. When the user is also satisfied with the image quality, he can authorise the transmission of the facial image in the form of the person-specific data to the apparatus 318 by means of a corresponding input.

It should be noted at this juncture that, for example following each capture of an image, a quality check can also be performed in order to check whether this image meets various quality criteria. By way of example, it can be checked each time whether the eyes of the user are open or closed in this image, such that unusable facial images are rejected from the outset and are in no way allocated for further data processing.

In order to now further increase the quality of the provided facial images, the head part 116 points at polarisation filters, both in front of the illuminant 306 and in front of the camera 302. The polarisation filter 308 in front of the illuminant 306 and the polarisation filter 304 in front of the camera 302 are rotated here through 90° relative to one another. By use of the polarisation filters, light reflections from reflective surfaces, such as spectacles or spectacle frames, are effectively suppressed, and the repolarised parts of the face 332 can be better seen. Due to the use of two polarisation filters 308 and 304, this effect is further intensified compared with the use of an individual polarisation filter 304 in front of the camera 302.

The camera 302 is additionally able to record infrared images of the person 316. On the one hand, this leads to images having a very high sharpness, such that the person 316 can be identified clearly in these images in front of the background 330. On the other hand, it is thus ensured that a photo print of a person is not held in front of the camera 302 instead of the actual living person 316. A photo print specifically will not provide in the infrared range infrared radiation characteristic for living individuals, such that in this case the camera 302 cannot provide any usable infrared information. The device 100 then knows that a manipulation attempt is underway. It will in this case abort the capture of the person-specific data.

The illuminant 306 may comprise a plurality of LED lighting strips, which can illuminate in different colours. The lighting apparatus itself is preferably arranged within the head part 116 contrary to the exemplary illustration of FIG. 3 and is manufactured from a translucent, i.e. light-permeable but not transparent, material. A diffuse light is thus produced, which is suitable for illuminating the person without casting harsh shadows. The translucent material, for example plastic, is provided within the housing over the entire area with the polarisation filter 308, with which, as described above, reflections for example in spectacles of the person 316 can be avoided. The lighting apparatus 118 surrounds the mirror 120 completely, such that a uniform illumination of the face 302 of the person 316 can be ensured. The LED lighting strips of the lighting apparatus 118 for example form a closed rectangle surrounding the semi-permeable mirror 120.

The lighting apparatus 118 may also be configured to illuminate the immediate vicinity in front of the camera 302, even before the facial images are captured in step 510. This is advantageous in darker areas, since the approach of a person in front of the camera can thus be detected more easily. For this purpose, two different lighting apparatuss can also be used, which can be arranged in or on the head part 116, wherein one is provided for optimal illumination of the people and the other is provided in order to produce the brightness difference.

Various steps will be explained hereinafter, again in a summarising and exemplary manner, these steps taking place once the device 100 has been put into operation. Once the device 100 has been switched on and once the control unit has been started, the program that performs the actuation of all elements, the calculations and the communication with the user, is started automatically.

The used control program moves the head part firstly into the basic state. For this purpose it actuates the lifting column 104, such that it moves the camera to a height of, for example, 1700 mm. This corresponds to the average height of a person. The program of the control unit then starts the continuous image recording by the camera 302.

The software of the control unit 320 then starts a movement detection, which operates permanently. For this purpose the program of the control unit runs image processing algorithms with each image taken by the camera, by means of which algorithms movements of the objects imaged by the camera are captured from the sequence of recorded images. The device remains in this state until it is approached by a person.

When a person approaches the device 100, the person is captured by the camera image and the movement detection operating within the program delivers a signal. The device then outputs the greeting "Welcome" through the loudspeaker 122 by means of voice output.

An operating element "button" with the indication "Start" is now displayed on the touch-sensitive screen. When the person presses this button with their finger the program branches into a procedure that controls the recording of all person-specific data. The program now runs an image processing algorithm with each image recorded by the camera, with which algorithm the pixel coordinates of pairs of eyes are determined.

When successful pixel coordinates of pairs of eyes have been determined, the height of the camera with respect to the height of the person is checked in the next step and corrected where necessary. For this purpose the differential value of these pixel coordinates compared with a default value in the vertical direction is determined. When this differential value exceeds a threshold value, a control signal for the lifting column is produced by the program and sent to the control electronics. This control signal causes the lifting column to lower or lift the entire structure, comprising control panel 110 and head part 116 with the camera 302 located therein, by a height that corrects the eye position of the person imaged in the camera image by the specified pixel difference in the vertical direction. This process can be repeated permanently provided person-specific data is being captured.

In a continuing technical embodiment, the eye position in the horizontal position can also be checked and corrected. For this purpose the position of the eyes in the horizontal direction is determined from the pixel coordinates of the eye positions. If the user is to be placed centrally in the horizontal direction in the image to be recorded, the half image width is then defined as default value for the pixel coordinates of the eye position. Other default values may also be defined. The difference is then determined from the defined default value and the pixel coordinates of the eye position in the horizontal direction. If this difference exceeds a predefined threshold value, the person is asked by the program by means of voice output to change their position accordingly. By way of example, the sentence "Please move 5 cm to the right" could be directed to the user by voice output. This process is repeated until the differential value of the pixel coordinates in the horizontal direction falls below the specified threshold value.

The image of the user is now located in an optimal position within the camera image. A number of freed images are now recorded. For this purpose images are now recorded by the camera at suitable time intervals, for example of one second, and are each illuminated and unilluminated alternately. The recording of the images is organised by the program as follows, by way of example:

$1^{st}$ second record $1^{st}$ unilluminated image and switch on lighting apparatus
$2^{nd}$ second record $1^{st}$ illuminated image
$3^{rd}$ second record $2^{nd}$ illuminated image and switch off lighting apparatus
$4^{th}$ second record $2^{nd}$ unilluminated image
$5^{th}$ second record $3^{rd}$ unilluminated image and switch on lighting apparatus
$6^{th}$ second record $3^{rd}$ illuminated image and switch off lighting apparatus Three image pairs are now provided, which each consist of an image of the person with switched-on lighting and an image of the person with switched-off lighting. The program now generates the respective differential image for each of the three image pairs. The respective freed personal portrait is created from the respective differential image and a defined threshold value.

When producing the differential image, the value 0 is assigned to each pixel of this differential image when the value of the pixel having the same coordinates in the differential image falls below a predefined threshold value. Otherwise, the value of the pixel having the same coordinates from the illuminated image with the person illuminated for the portrait recording is assigned to the pixel.

The camera is preferably equipped with a lens, with which a short depth of field can be provided in the digital images of the camera. Images that have been created using a lens with short depth of field have the property that the background thereof has few edges, whereas many edges are visible in the foreground. This can be described mathematically by the number of resolvable line pairs/mm as described above. In particular objects located in the foreground are separated from the background by a clear edge by means of such a lens. The identification of this edge can be used to optimise the described elimination method.

This procedure of optimised elimination will be explained hereinafter: edge identification is performed firstly with one of the illuminated images of the person and the result is then stored in a binary image, for example.

An outer contour from the binary image with the edges is then determined with use of known image processing algorithms. The resultant result is stored in a further binary image, for example, wherein all pixels that lie on the paths of the contours are assigned the value 1 and all other pixels are assigned the value 0.

The contour is now provided as a closed polygon, for example as a data array. It is then determined for each image point whether this lies inside or outside the polygon. For this purpose a suitable point-in-polygon test is performed. Point-in-polygon tests are known algorithms.

The previously produced differential image is now corrected or optimised. There are a number of possibilities for this purpose. On the one hand each pixel of this differential image can again be assigned either the value 0 when the pixel lies outside the polygon, or the value of the pixel is retained when the pixel lies within the polygon.

It is possible on the other hand to optimise the differential image by performing a weighting when forming the differential image: image points within the polygon obtain a low threshold value for the differential formation, whereas image points outside the polygon obtain a higher threshold value.

In a further technical variant other methods for optimising the elimination from personal portraits can also be used. By way of example, methods of movement detection are conceivable in order to separate the foreground and the background form one another in a camera image.

The three freed images are displayed on the touchscreen. In addition, a request is output to the user to select one of the freed images. The selected image is stored. Should the user not be happy with any of the freed images, the entire process can be started from the beginning.

The program then allows the user to input all further person-specific data. For this purpose a sequence of input masks are depicted on the touchscreen. The data input by the user is stored together with the freed images.

The data can also be read in by an identification document reader (reader) from an identification document already provided. The decision as to which input form is selected is made for example by the user.

The data to be recorded may also include the recording of a fingerprint. A fingerprint reader is to be integrated in the machine for this purpose.

As a last input, the signature of the user is requested by the program. The signature is provided using an input stylus or finger suitable for the operation of the installed touchscreen.

All captured data is then transmitted automatically to the central data capture station. There, the printing of a corresponding identification document is initiated, possibly following a further check.

All inputs are thus complete and the machine dismisses the user. For this purpose the program generates a corresponding voice output. By way of example, the following sentences could be output by voice output: "Thank you for inputting your data. Please go to the ID collection point. Your ID is waiting for you there."

In a continuing technical embodiment the program starts a biometric facial recognition, and the user actuates the start button. A comparison template is first laid out by the user. A biometric facial recognition is performed at regular intervals, for example every 5 seconds or after certain triggering inputs, whilst the user performs the entire above-described input process. It can thus be ensured that all inputs are made by the same person. Misuse of the device is thus hampered.

LIST OF REFERENCE SIGNS 100 device
102 stand
104 lifting column
106 direction
108 reader
110 control panel
112 touch-sensitive screen
114 fingerprint sensor
116 head part
118 lighting apparatus
120 mirror
122 loudspeaker
300 drive
302 camera
304 polarisation filter
306 lighting means
308 polarisation filter
310 data line
312 direction
314 eyes
316 person
318 apparatus
320 control apparatus
322 processor
324 interface
326 memory
328 facial image
330 background
332 face
334 facial image

The invention claimed is:

1. A device for capturing person-specific data of a person, wherein the person-specific data comprises a facial image of the person, the device comprises:
  a camera for recording an image of a face of the person;
  a lighting apparatus configured to illuminate the person from the front;
  a semi-transparent mirror, the semi-transparent mirror between the person and the camera, and the semi-transparent mirror oriented such that on a side of the semi-transparent mirror faces towards the person the optical path of light incident on the semi-transparent mirror is parallel to an optical path of a portion of the light reflected back by the semi-transparent mirror; and
  a control unit configured to capture the person-specific data, by:
    controlling the lighting apparatus to generate white light to illuminate the face of the person, controlling the camera to capture a first image of the face of the person while the white light is generated via the lighting apparatus,
    controlling the camera to capture a second image of the face of the person via the camera without generating the white light,
    forming a first differential image of the first image and the second image such that a background is substantially removed from the first differential image the person-specific data including the first differential image as the facial image,
    controlling the lighting apparatus to generate colored or infrared light to illuminate the face of the person with the colored or infrared light,
    controlling the camera to capture a third image of the face of the person while the colored or the infrared light is generated via the lighting apparatus,
    controlling the camera to capture a fourth image of the face of the person via the camera without generating the colored or infrared light,
    form a second differential image of the third image and the fourth image such that the background is substantially removed from the second differential image,
    calculating first outer contours of the face from the second differential image, and correcting the first differential image based on the first outer contours calculated from the second differential image.

2. The device according to claim 1, wherein
the first image and the second image include correlated pixels,
brightness differences between correlated pixels in the first image and the second image are used to form the first differential image, and
all correlated pixels with brightness differences below a threshold value are associated with the background.

3. The device according to claim 1, wherein
the camera includes a lens, the camera is configured to use the lens to capture exclusively the face of the person in focus and to capture the background out of focus,
the control unit is further configured to
calculate second outer contours of the face from a sharpness differences of the face of the person and of the background, the sharpness difference being based on the face of the person being in focus and the background being out of focus; and
correct the first differential image based on the second outer contours.

4. The device according to claim 1, wherein
the lighting apparatus is configured to illuminate the person with polarized light,
the camera includes a polarization filter,
a polarization direction of the polarized light and a polarization direction of light transmitted through the polarization filter into the camera are rotated by 90 degrees relative to one another.

5. The device according to claim 1, wherein
the control unit is further configured to,
analyze the facial image of the person, the analyzing the facial image of the person including a determination of head posture and/or eye posture, and
if the head posture and/or the eye posture does not meet predefined criteria, to automatically reject the facial image of the person.

6. The device according to claim 1, wherein
the camera is further configured to capture a plurality of images successively in a video stream, and
the control unit is further configured, when forming the first differential image and/or the second differential image, to use only images of the video stream that meet predefined quality criteria.

7. The device according to claim 6, wherein
the predefined quality criteria include at least one of a predefined spatial position of an eye area of the person, a maximally admissible movement blur, and a predefined size of the face of the person in the images.

8. The device according to claim 1, wherein
a drive unit is configured to adjust a height of the camera, wherein the control unit is also configured,
to capture a spatial position of an eye area of the person relative to a position of the camera, and
if the spatial position of the eye area is not located in a predefined region relative to the position of the camera, to actuate the drive unit in order to automatically move the height of the camera via the drive unit, such that the spatial position of the eye area is located in the predefined region relative to the position of the camera.

9. The device according to claim 1, wherein
the camera is configured to capture infrared light,
the control unit is further configured to
capture a fifth image of the face of the person via the camera without illumination of the face of the person via the lighting apparatus, the fifth image captured in the infrared wavelength range;
calculate second outer contours of the face from the fifth image; and
correct the first differential image with the second outer contours.

10. The device according to claim 1, further comprising:
a reader for an identification document of the person, the reader configured, in an activated state, to read out personalized information of the person from the identification document, the person-specific data including the personalized information.

11. The device according to claim 10, wherein the control unit is further configured to set the reader exclusively into the activated state, at most until the image of the face of the person is captured by the camera.

12. The device according to claim 1, further comprising:
a fingerprint sensor, the fingerprint sensor configured, in an activated state, to capture a fingerprint of the person, the person-specific data including the captured fingerprint.

13. The device according to claim 1, further comprising:
a control panel, the control panel configured, in an activated state, to capture an alphanumeric data input of the person and/or an input of a signature of the person, the person-specific data including the captured data input and/or the signature.

14. The device according to claim 1, further comprising:
a network interface,
wherein the device is configured to transfer the person-specific data via the network interface to an apparatus for automated generation of an identification document from the person-specific data or to an apparatus for verifying the person-specific data.

15. The device according to claim 1, wherein
the device is a freestanding machine, and
the machine is free from a back wall arranged behind the face of the person to be captured as viewed from the camera.

16. The device according to claim 1, wherein the lighting apparatus is arranged around the semi-transparent mirror.

17. A method for capturing person-specific data of a person using a device, wherein the person-specific data including a facial image of the person, the device including a camera configured to record an image of the face of the person, a lighting apparatus and a semi-transparent mirror, the semi-transparent mirror between the person and the camera, the semi-transparent mirror oriented such that, on a side of the semi-transparent mirror facing towards the person, an optical beam of light incident on the semi-transparent mirror is parallel to the optical beam of a portion of the light reflected back by the semi-transparent mirror, and the lighting apparatus is configured to illuminate the person from the front, the method comprises:
generating white light via the lighting apparatus to illuminate the face of the person, capture a first image of the face of the person while the white light is generated via the lighting apparatus;
capturing a second image of the face of the person without generating the white light;
forming a first differential image of the first image and the second image such that a background is substantially removed from the first differential image the person-specific data including the first differential image as the facial image;

controlling the lighting apparatus to generate colored or infrared light to illuminate the face of the person with the colored or infrared light, controlling the camera to capture a third image of the face of the person while the colored or the infrared light is generated via the lighting apparatus;

controlling the camera to capture a fourth image of the face of the person via the camera without generating the colored or infrared light;

form a second differential image of the third image and the fourth image such that the background is substantially removed from second differential image;

calculating outer contours of the face from the second differential image; and correcting the first differential image based on the calculated outer contours.

18. A non-volatile computer-readable medium including computer executable instructions that when executed by a processor cause the processor to perform the method according to claim 17.

19. A signal sequence which, when stored in a computer, constitutes a sequence of instructions, which, when executed on a computer, causes the computer to execute the method of claim 18.

* * * * *